United States Patent [19]
Mischenko

[11] 3,787,003
[45] Jan. 22, 1974

[54] DUAL REEL DRIVE
[75] Inventor: Nicholas Mischenko, Chicago, Ill.
[73] Assignee: Bell & Howell Company, Chicago, Ill.
[22] Filed: July 25, 1972
[21] Appl. No.: 275,033

[52] U.S. Cl................................ 242/192, 242/205
[51] Int. Cl......................... G03b 1/04, G11b 15/32
[58] Field of Search.................. 242/192, 197–205; 352/166, 173, 180, 181, 197; 74/766, 772, 208, 211, 405, 810

[56] References Cited
UNITED STATES PATENTS
2,979,277   4/1961   Page et al. .......................... 242/201
2,673,041   3/1954   Hittle.................................. 242/192

Primary Examiner—Leonard D. Christian
Attorney, Agent, or Firm—K. W. Greb; J. E. Peele, Jr.

[57] ABSTRACT

A motion picture projector having a roller drive for winding film on both the take-up and supply reels.

8 Claims, 4 Drawing Figures

DUAL REEL DRIVE

BACKGROUND - SUMMARY OF THE INVENTION

This invention relates to motion picture projectors and in particular to an improved projector which utilizes roller drive at both the supply and take up reels.

Roller drive includes a friction roller that engages the flanges on the film reel to wind film onto the reel. The advantages of roller drive are known and it has been used in the past on either the supply reel or the take up reel. However, it has not been used for both reels on the same projector.

This invention presents a motion picture projector which has roller drive on both the supply and take up reels. Two movable sets of gears are provided to drive each roller. The movable gears utilized are identical for both supply and take up rollers. Thus, this projector may be produced economically and assembly errors which arise because of dissimilar parts are virtually eliminated.

BRIEF DESCRIPTION OF THE DRAWINGS

The features of this invention will become more apparent in the following description of a preferred embodiment when read in conjunction with the Figures in which.

DETAILED DESCRIPTION OF A PREFERRED EMBODIMENT

Figure 1:
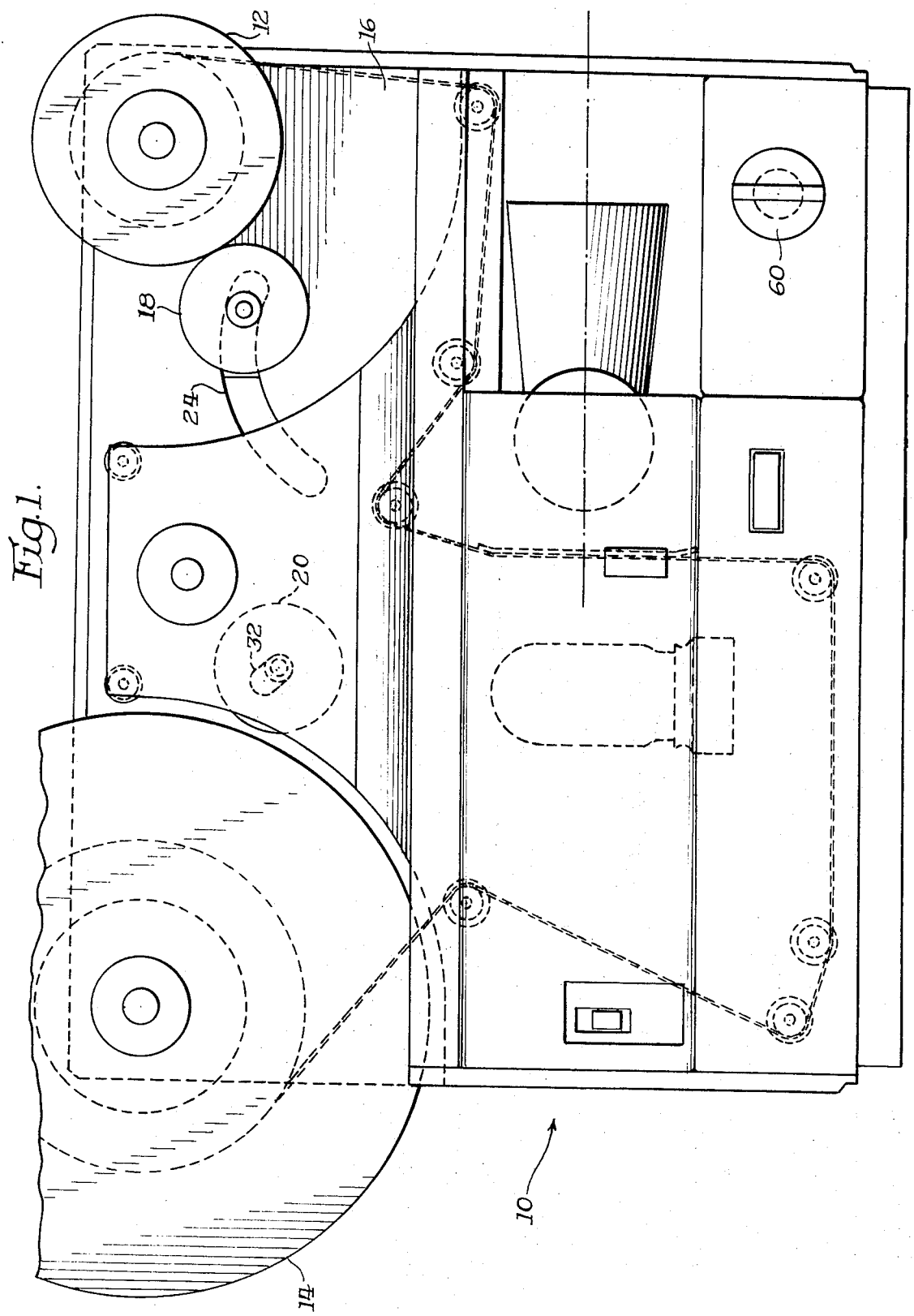
FIG. 1 is a schematic elevational view of a motion picture projector embodying the principles of this invention.

Referring now to the Figures wherein like reference numerals designate like parts a motion picture projector 10 is illustrated in FIG. 1. A supply reel 12 and a take up reel 14 are rotatably mounted to the projector 10. The film 16 is threaded through the projector from the supply reel 12 to the take up reel 14. A supply roller 18 is included to engage the flanges of the supply reel 12 to rotate the supply reel 12 counter-clockwise when the projector 10 is operated in a reverse direction. Similarly, a take up roller 20 is provided to drive the take up reel 14 by engaging its flanges when the projector 10 is operated in a forward direction. The rollers 18, 20 may be pivoted into engagement with their respective reels along arcs defined by slots 22 and 24 which are formed in the projector housing.

Figure 2:
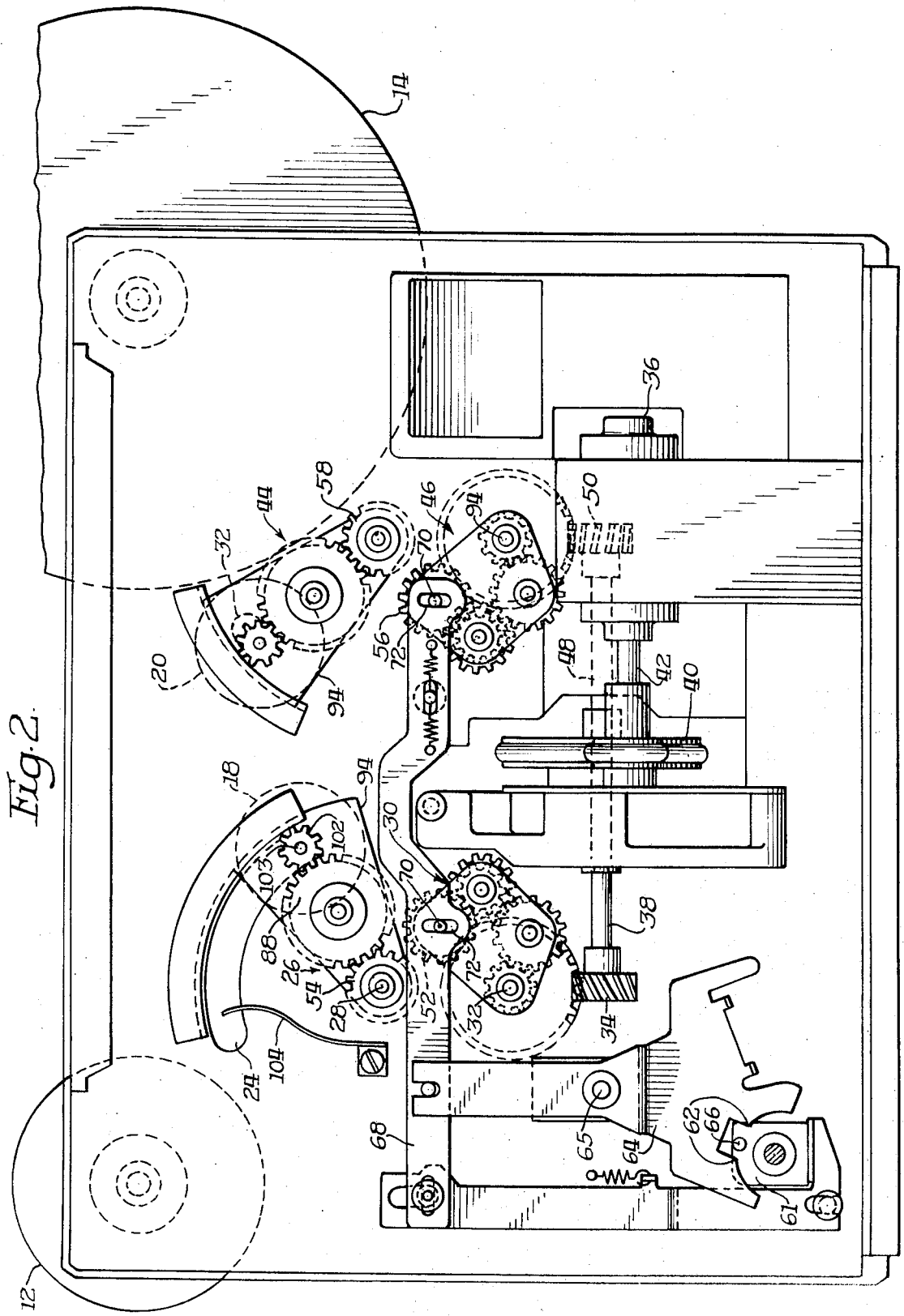
FIG. 2 is a rear elevational view of the motion picture projector shown in FIG. 1 with the cover removed to illustrate the apparatus which utilizes the principles of this invention.

Referring to FIG. 2, the supply roller 18 may be both pivoted into engagement with the supply reel 12 and rotated by a roller drive train 26 which is pivoted at 28. The roller drive train 26 may be activated when a selectively insertable gear cluster 30 is brought into engagement therewith. The selectively insertable gear cluster 30 is pivoted at 32 and meshes with a worm gear 34 which is coupled to a motor 36 through a shaft 38, pulleys 40 and a drive shaft 42. In like fashion, the take up roller 20 is activated through a roller drive train 44 and a selectively insertable gear cluster 46 which is coupled to the motor 36 through the shaft 42, pulleys 40, shaft 48 and worm gear 50.

The supply roller 18 is activated when a drive gear 52, which is part of the selectively insertable gear cluster 30, is meshed with idler gear 54 which is part of the roller drive train 26. The take up roller 20 is activated when a drive gear 56, which is part of the selectively insertable gear cluster 46, is meshed with idler gear 58 which is a part of the take up roller drive train 44. As depicted in FIG. 2 neither drive gear 52, 56 is meshed with its associated idler gear 54, 58 in the roller drive trains 26, 44 and consequently neither roller 18, 20 is engaged with its associated reel 12, 14. To activate the rollers 18, 20 the motion picture projector includes a control knob 60 which operates a cam 61 carrying a pin 66 acting on abutments 62 of a lever 64 for rotating the lever 64 about pivot point 65. When the lever 64 is rotated it slides a link 68 either rightwardly or leftwardly depending on the direction of rotation of the lever 64. The link 68 is coupled with the selectively insertable gear clusters 30, 46 through pin and slot arrangements 70 and 72. Thus, when the link 68 is moved rightwardly from the position shown in FIG. 2 the selectively insertable gear cluster 46 pivots about 74 and drive gear 56 engages idler gear 58. Similarly, when the link 68 is moved leftwardly from the position shown in FIG. 2 the selectively insertable gear cluster 30 pivots about 32 and drive gear 52 meshes with idler gear 54.

Figure 3:
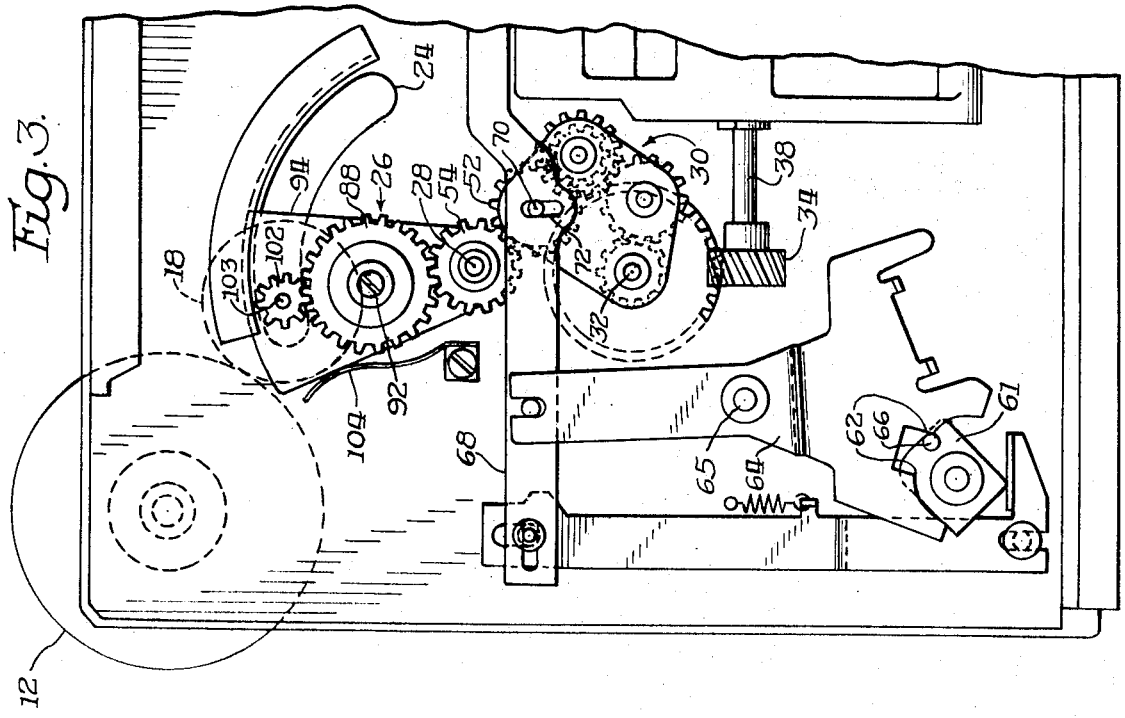
FIG. 3 illustrates a portion of FIG. 2 when the motion picture projector is operating in a reverse direction.

In FIG. 3 the link 68 has been moved leftwardly from the position shown in FIG. 2 and drive gear 52 is meshed with idler gear 54. As may be seen in FIG. 3 the supply roller 18 has pivoted counter-clockwise and is in engagement with the flanges of the supply reel 12.

Figure 4:
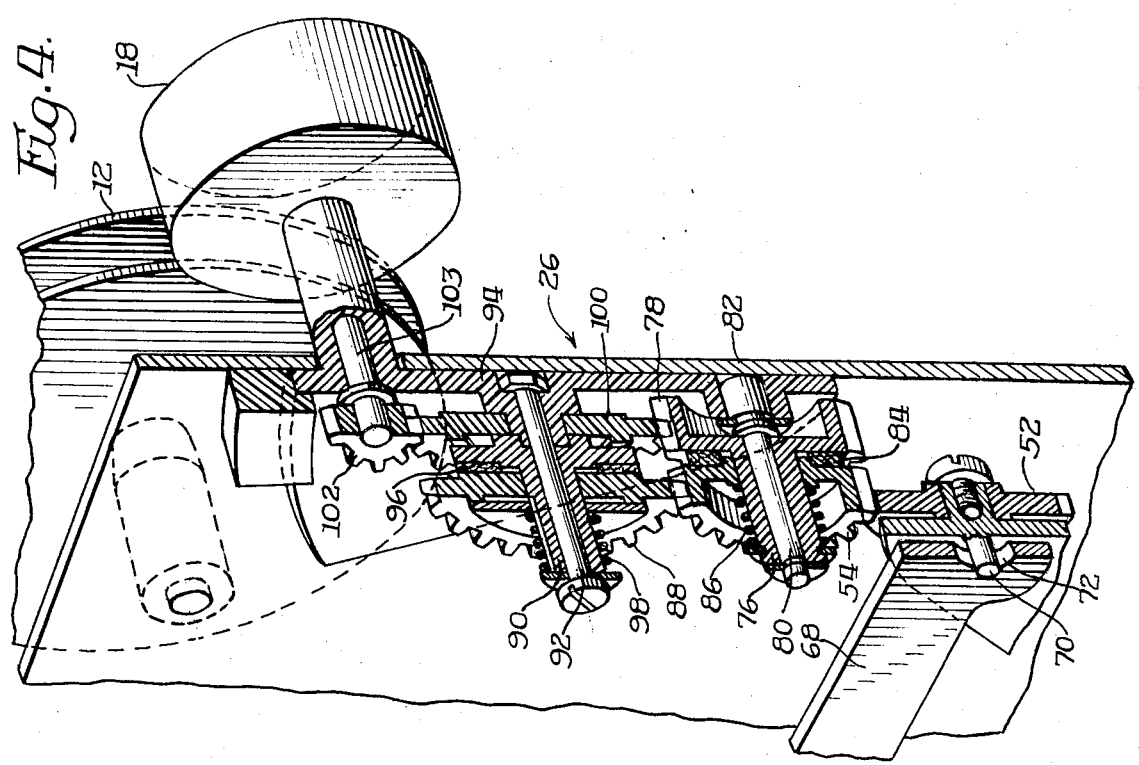
FIG. 4 is a perspective view, partially in cross-section of the roller drive train as illustrated in FIG. 3.

The operation of the roller drive trains 26, 44 will now be described in conjunction with FIG. 4 which illustrates the supply roller drive train 26 in cross section.

Since the operation of the roller drive trains 26, 44 are identical, a description of one is sufficient to understand the other. In FIG. 4 the link 68 has been moved leftwardly from the position shown in FIG. 2 to bring drive gear 52 into engagement with idler gear 54. Idler gear 54 is rotatably mounted on a sleeve 76 which is integral with a gear 78 that is rotatably mounted to a shaft 80. The shaft 80 is rigidly affixed to the motion picture projector housing 82. A friction washer 84 is disposed between idler gear 54 and gear 78 and a predetermined load may be placed thereon by the action of compression spring 86.

Idler gear 54 meshes with an intermediate gear 88 which is mounted for rotation about a sleeve 90. The sleeve 90 is affixed to a shaft 92 that is keyed to a roller supporting arm 94. A friction washer 96 is sandwiched between intermediate gear 88 and a radially offset portion of the sleeve 90. A pre-determined force is applied to the friction washer 96 by a compression spring 98.

An intermediate gear 100 meshes with gear 78 and is mounted for rotation about a portion of the supporting arm 94. The intermediate gear 100 also meshes with pinion gear 102 to drive the roller 18 through a shaft 103.

The coaction of idler gear 54 and intermediate gear 88 causes the roller to be rotated into engagement with the supply reel 12. When the drive gear 52 meshes with idler gear 54, idler gear 54 cannot freely rotate because of the action of friction washer 96 on intermediate gear 88. The resulting torque causes the supporting arm 94 to rotate counter-clockwise and move the roller 18 into engagement with a supply reel 12. When the roller 18 engages the supply reel 12, gear 88 overcomes the force applied by the friction washer 96 and begins to rotate.

As gear 54 rotates, it also rotates gear 78 because of friction washer 84. The rotation of gear 78 is transmitted through intermediate gear 100, pinion gear 102 and shaft 103 to rotate the roller 18.

When the drive gear 52 is removed from engagement with idler gear 54, a leaf spring 104 pushes the roller drive train 26 rightwardly until gravity causes it to return to the position shown in FIG. 2. Because of the disposition of roller drive train 44 gravity alone will return it to its disengaged position.

Thus, a motion picture projector has been described that utilizes the benefits of roller drive at both the supply and take up reels. As disclosed in the preferred embodiment these benefits may be provided at low cost by using identical roller drive trains 26, 44 and identical selectively insertable gear clusters 30, 46.

What is claimed is:

1. A reel drive for a motion picture projector having rotatably mounted flanged film supply reel and a rotatably mounted flanged film take-up reel, said reel drive comprising:
   a motor driving means;
   a first roller supported for movement from an ineffective position to an effective position for engaging the flanges of the supply reel, said first roller in said effective position being rotatable by said motor drive means for winding film on the supply reel;
   a second roller supported for movement from an ineffective position to an effective position for engaging the flanges of the take up reel, said second roller in said effective position being rotatable by said motor driving means for winding film on the take up reel;
   arm means supporting said first roller;
   friction means cooperating with said arm means for lifting said arm means and said first roller from said ineffective position to said effective position responsive to a force on said friction means by said motor driving means; and
   means supporting said second roller and operable for carrying said second roller to and from said ineffective and effective positions.

2. A reel drive as defined in claim 1 wherein said friction means includes a friction member operable to slip for holding said second roller in said effective position during rotation of said second roller by said gear train.

3. A reel drive as defined in claim 1 wherein said motor driving means includes a first gear train operable from an ineffective position to an effective position for rotating said first roller and a second gear train operable from an ineffective position to an effective position for rotating said second roller and control means for selectively coupling said first gear train to said first roller and for selectively coupling said second gear train to said second roller.

4. A reel drive as defined in claim 3 wherein said control means includes a link connected to said first gear train and to said second gear train, said link being operable to uncouple one of said first and second gear trains upon coupling the other of said first and second gear trains.

5. A reel drive for a motion picture projector having rotatably mounted flanged film supply reel and a rotatably mounted flanged film take-up reel, said reel drive comprising:
   a motor driving means;
   a first roller supported for movement from an ineffective position to an effective position for engaging the flanges of the supply reel, said first roller in said effective position being rotatable by said motor driving means for winding film on the supply reel;
   a second roller supported for movement from an ineffective position to an effective position for engaging the flanges of the take up reel, said second roller in said effective position being rotatable by said motor driving means for winding film on the take up reel;
   arm means supporting said first roller;
   friction means cooperating with said arm means for lifting said arm means and said first roller from said ineffective position to said effective position responsive to a force on said friction means by said motor driving means; and
   means supporting said second roller and operable for carrying said second roller to and from said ineffective and effective positions;
   control means for selectively coupling said driving means to said first roller and said second roller for moving said roller to an effective position and rotating said coupled roller when said roller is in said effective position.

6. A reel drive as in claim 5 wherein said control means includes a link connected to said first gear train and to said second gear train, said link being operable to uncouple one of said first and second gear trains upon coupling the other of said first and second gear trains.

7. A reel drive as in claim 5 further comprising friction means cooperating with said motor driving means and each of said rollers for moving said roller to an effective position and rotating said roller when in said effective position.

8. A reel drive for a motion picture projector having a rotatably mounted flanged film supply reel and a rotatably mounted flanged film take up reel, said reel drive comprising:
   a motor driving means;
   a first roller movable from an ineffective position to an effective position for engaging the flanges of the supply reel, said first roller in said effective position being rotatable by said motor driving means for winding film on the supply reel;
   a second roller movable from an ineffective position to an effective position for engaging the flanges of the take up reel, said second roller in said effective position being rotatable by said motor driving means for winding film on the take up reel;
   first means supporting said first roller;
   second means supporting said second roller; and
   friction means cooperating with each said first and said second supporting means for selectively moving said first and said second roller from said ineffective position to said effective position responsive to transmission of rotation to said roller from said motor driving means.

* * * * *